(12) United States Patent
Ferry et al.

(10) Patent No.: US 10,137,741 B2
(45) Date of Patent: Nov. 27, 2018

(54) DISPLAY ASSEMBLIES AND METHODS FOR APPLYING THE SAME TO VULCANIZED RUBBER ARTICLES

(71) Applicants: Keith George Ferry, Studio City, CA (US); Jason Michael Busch, Studio City, CA (US)

(72) Inventors: Keith George Ferry, Studio City, CA (US); Jason Michael Busch, Studio City, CA (US)

( * ) Notice: Subject to any disclaimer, the term of this patent is extended or adjusted under 35 U.S.C. 154(b) by 283 days.

(21) Appl. No.: 15/139,272

(22) Filed: Apr. 26, 2016

(65) Prior Publication Data

US 2017/0001480 A1   Jan. 5, 2017

Related U.S. Application Data

(60) Provisional application No. 62/153,441, filed on Apr. 27, 2016.

(51) Int. Cl.
| | |
|---|---|
| *B60C 13/00* | (2006.01) |
| *B29C 65/52* | (2006.01) |
| *B29C 65/00* | (2006.01) |
| *B32B 7/12* | (2006.01) |
| *B32B 25/04* | (2006.01) |
| *B29D 30/72* | (2006.01) |
| *B44C 1/16* | (2006.01) |
| *B29L 30/00* | (2006.01) |

(52) U.S. Cl.
CPC ............ *B60C 13/001* (2013.01); *B29C 65/52* (2013.01); *B29C 66/02245* (2013.01); *B29C 66/5326* (2013.01); *B29D 30/72* (2013.01); *B32B 7/12* (2013.01); *B32B 25/042* (2013.01); *B44C 1/162* (2013.01); *B29D 2030/728* (2013.01); *B29L 2030/00* (2013.01)

(58) Field of Classification Search
CPC .... B60C 13/001; B32B 7/12; B29D 2030/728
USPC ................... 428/914; 427/148; 156/116, 240
See application file for complete search history.

(56) References Cited

U.S. PATENT DOCUMENTS

| | | |
|---|---|---|
| 4,461,795 A | 7/1984 | Ogawa |
| 5,198,301 A | 3/1993 | Hager et al. |
| 5,300,164 A | 4/1994 | DeTrano et al. |
| 5,508,084 A | 4/1996 | Reeves et al. |
| 6,030,676 A | 2/2000 | Cottin et al. |
| 6,080,465 A | 6/2000 | Boissonnet et al. |

(Continued)

OTHER PUBLICATIONS

PCT; International Search Report and Written Opinion dated Jul. 27, 2016 in Application No. PCT/US2016/029605.

*Primary Examiner* — Fred M Teskin
(74) *Attorney, Agent, or Firm* — Snell & Wilmer L.L.P.

(57) ABSTRACT

Display assemblies as disclosed herein are configured for attachment with a vulcanized rubber article and are provided in the form of different material layers. Display assemblies generally comprise one or more display layers of elastomeric material configured to provide a desired display indicia, an intermediate layer formed from an elastomeric material different from that of the one or more display layers, and an adhesive layer wherein the intermediate layer is interposed between the adhesive layer and the one or more display layers. The one more display layers may be configured to act together or separately to provide a desired display indicia to provide a desired visual display or feature on the surface of the vulcanized rubber article, which may be a sidewall surface of a tire.

20 Claims, 8 Drawing Sheets

(56) References Cited

U.S. PATENT DOCUMENTS

| | | |
|---|---|---|
| 6,235,376 B1 | 5/2001 | Miyazaki et al. |
| 6,391,134 B1 | 5/2002 | Lipovac |
| 7,387,144 B2 | 6/2008 | Byrne |
| 8,834,974 B1 | 9/2014 | Ferry et al. |
| 2005/0059308 A1 | 3/2005 | Parsons |
| 2010/0092716 A1 | 4/2010 | Spychalsky |

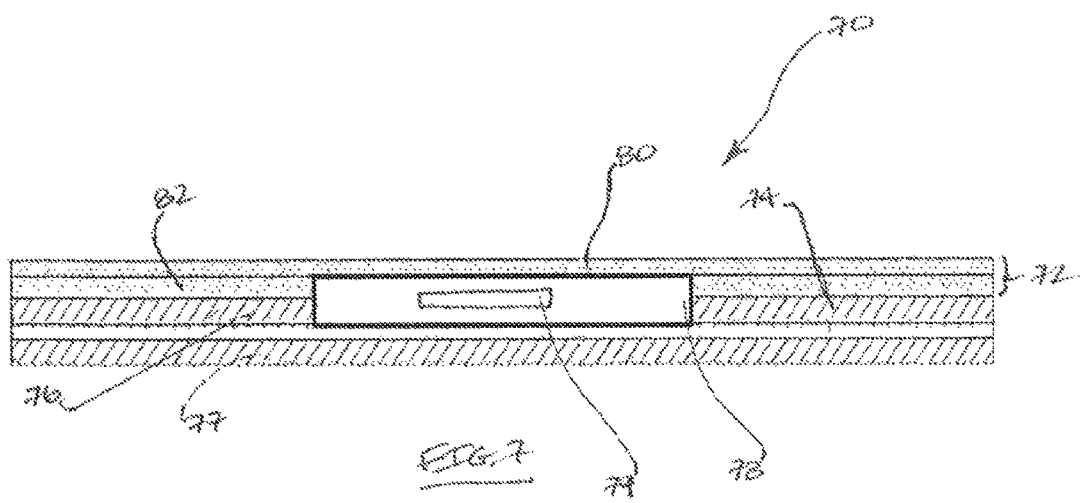

DISPLAY ASSEMBLIES AND METHODS FOR APPLYING THE SAME TO VULCANIZED RUBBER ARTICLES

CROSS-REFERENCE TO RELATED APPLICATIONS

This patent application claims the benefit of U.S. Provisional Patent Application No. 62/153,441, filed on Apr. 27, 2015, which is hereby incorporated by reference in its entirety.

FIELD

This disclosure relates to display assemblies and methods for applying the same to a vulcanized rubber article.

BACKGROUND

The use of decals or the like for use on vulcanized rubber articles such as a sidewall portion of a tire or the like is somewhat known in the art, e.g., in the form of lettering and/or designs, for the purpose of adding features of aesthetic appearance, branding or the like to the vulcanized article containing the same. Such decals known in the art adapted for such uses are constructed in a manner that is either intended for temporary rather than permanent service, and/or that is adapted for application at a point of manufacture of the vulcanized articles. For example, traditional techniques for establishing tire sidewall markings involve extrusion or molding of black rubber and often the addition of colored inks which are cured in parallel with the tire during the vulcanization process. This process, though well established and scaled for industry, requires significant investment in materials, equipment and labor along with sizable wastage costs resulting from voids, blemishes and other defective designs. In addition, this technique is extremely limiting in terms of customizable designs due to molds and dies required to achieve the desired variations, and thus the availability of this customization to individual consumers and even customers internal to the industry is extremely limited.

It is, therefore, desired that display assemblies for use with a vulcanized article be constructed in a manner that permits not only variation in the nature of the display itself, e.g., the nature of the indicia be it one or a combination of characters, designs, emblems, and combinations thereof and the like, but variation in the method of applying the same so as to facilitate application as part of or subsequent to the manufacture of the vulcanized article. It is further desired that such display assembly be constructed in a manner that facilitates use of the same once applied for a long duration, e.g., the life of the vulcanized article. It is still further desired that such display assembly be constructed in a manner so as to facilitate such long-term without sacrificing the integrity and aesthetic appearance of the display assembly.

SUMMARY

Display assemblies as disclosed herein are specially constructed for attachment with a vulcanized rubber article to provide a desired display indicia, which may be a visual display or a feature that is visually or otherwise detectable. Display assemblies as disclosed herein generally comprise a composite of different material layers specially engineered to provide a desired display indicia in a manner that will last a long time on the vulcanized rubber article. Display assemblies comprise one or more display layers of elastomeric material configured to provide a desired display indicia, an intermediate layer formed from an elastomeric material different from that of the one or more display layers, and an adhesive layer, wherein the intermediate layer is interposed between the adhesive layer and the one or more display layers.

In an example, the adhesive layer is formed from a material forming a chemical bonding between the display assembly and the surface of the vulcanized rubber article. The display assembly may comprise two display layers, wherein one display layer may be disposed beneath another display layer, and wherein the display layers may each be of a different color and/or be patterned or otherwise configured so as to provide a desired display indicia by interaction of the two. An intermediate adhesive layer may be interposed between one or more display layers and the intermediate layer. If desired, a transparent protective layer may be disposed over the one or more display layers, forming an outermost surface of the display assembly. The display assembly may comprise a cavity disposed therein that may include an element disposed therein.

Display assemblies as disclosed herein may be attached to the surface of a vulcanized article by applying an adhesive material to form the adhesive layer, wherein the adhesive layer may be applied to one or both of the surface of the vulcanized article and an underlying surface of the display assembly, and placing a display assembly into contact with the surface of the vulcanized rubber article to form a bond between the display assembly and surface. In an example, a stencil may be used to ensure placement of the display assembly in a desired arrangement, or a transfer carrier may be used to provide the display assembly in the desired arrangement for placement onto the surface.

Display assemblies as disclosed herein are constructed provide flexibility in the nature of the display indicia itself, and variation in the method of applying the same so as to facilitate application as part of or subsequent to the manufacture of the vulcanized article. Also, display assemblies as disclosed herein are constructed in a manner that facilitates use of the same once applied for a long duration, e.g., the life of the vulcanized article, without sacrificing the integrity and/or aesthetic appearance of the display assembly.

BRIEF DESCRIPTION OF THE DRAWINGS

These and other features and advantages of display assemblies and methods for making the same as disclosed herein will be appreciated as the same becomes better understood by reference to the following detailed description when considered in connection with the accompanying drawings wherein:

FIG. 7 is a cross section side view of a fifth example display assembly as disclosed herein comprising a multiple layer assembly '70' with cavity '78' having an embedded functional element '79' within the construction of the assembly, wherein the assembly '70' comprises a double display layer '72' with aesthetic layers 80 and 82 which also serve as perimeter layers to the cavity '78', wherein the display layers are vulcanized and bonded to a barrier layer '76' with a permanent adhesive layer '74' and having another layer of permanent adhesive '77' for bonding to the vulcanized rubber article.

DETAILED DESCRIPTION

Display assemblies or constructions as disclosed herein are specially engineered to facilitate attachment to a vulcanized article, which may include but is not limited to tires, mud flaps, or any other member or element that is vulcanized or made from vulcanized rubber. Display assemblies as disclosed herein are provide for the purpose of providing a desired aesthetic appearance, product identification, tracking, branding, advertising, to provide a desired functional aspect to the vulcanized article, and the like to such vulcanized article. In an example, display assemblies as disclosed herein may comprise one or more elastomeric display layers providing the desired display image or function, an intermediate or barrier layer formed of an elastomeric material, and a layer of curable adhesive that is formed from a material capable of forming a strong adhesion bond with a surface of the vulcanized article. The display assemblies as disclosed herein may optionally comprise an adhesive layer interposed between the display layer and one or more of the barrier layers, and may comprise various combinations of one or more display layers, one or more intermediate or barrier layers, and one or more adhesive layers as called for by the specific end use application. Further, display assemblies as disclosed herein may optionally comprise an overcoat or transparent protective layer disposed over the display layer.

Figure 1:
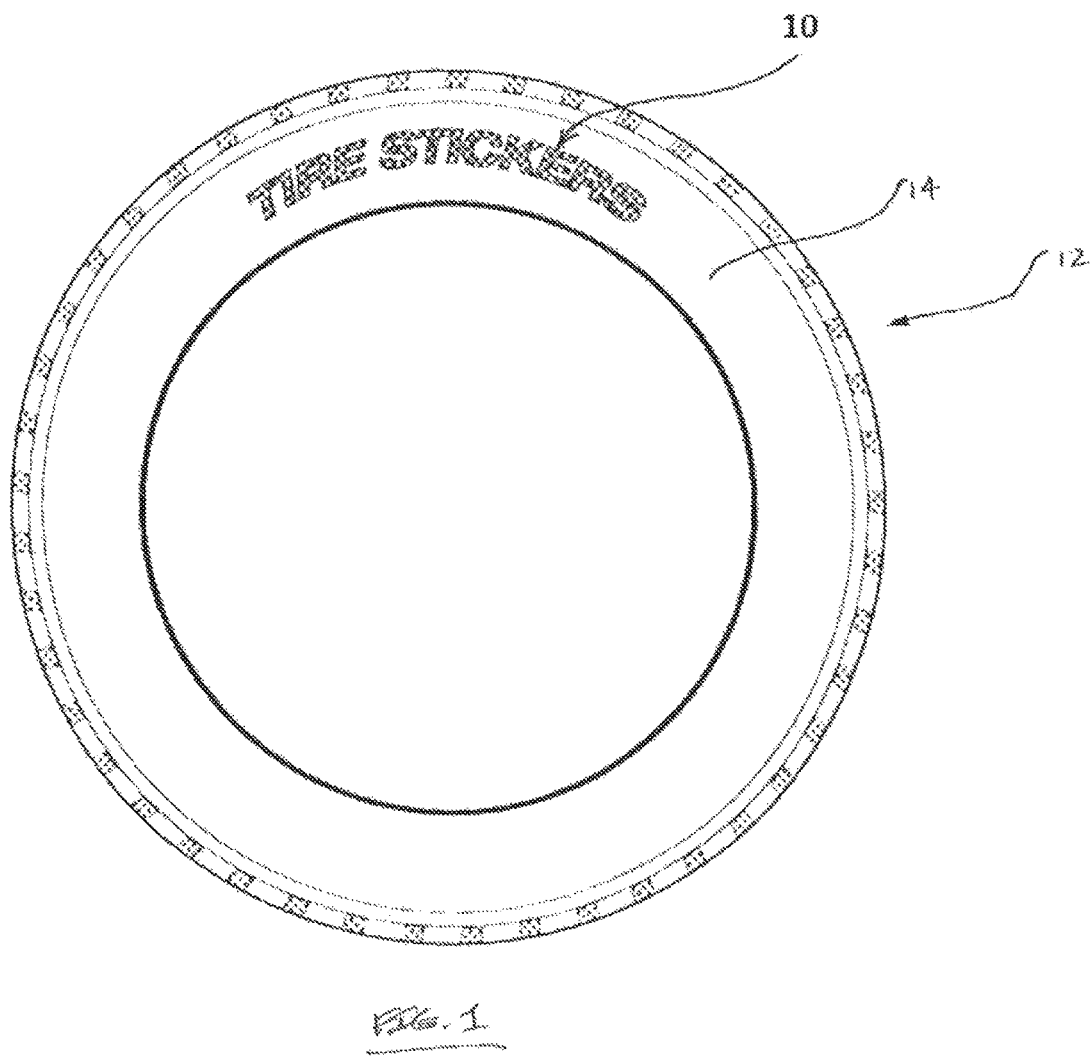
FIG. 1 is a perspective view of an example display assembly as disclosed herein as attached to a vulcanized article in the form of a tire sidewall.

FIG. 1 illustrates an example display assembly or construction 10 as disclosed herein as attached to a vulcanized article 12. Display assemblies as disclosed herein can be used with a variety of differently configured vulcanized articles, wherein a unifying feature of such articles or attachment substrates is that they are formed from or have an outer surface comprising vulcanized rubber. In an example, the vulcanized article may be a rubber tire, wherein the display assembly is configured to be adhered to a portion of the rubber tire. In an example, the portion of the rubber tire may be a sidewall 14 of the tire. While a particular configuration or type of vulcanized article, and a particular portion of such article, has been described as being useful as the article or substrate for adhering display assemblies as disclosed herein thereto, it is to be understood that the use of display assemblies as disclosed herein is not to be limited to such types of vulcanized articles and/or portion of the same, and such is provided for purpose of example and reference.

The display assembly 10 is provided in a desired form or configuration depending on the desired display indicia or function intended, which can be in the form of a letter, numeral, symbol, design, pattern, logo, insignia, or the like that may be continuous or non-continuous in form depending on the particular end-use application. For example, the display assembly 10 can be configured in the shape of a letter and a number of the display assemblies can be used alone or in conjunction with one or more other display assemblies that may be continuous with one another or separate from one another to provide a desired word, term, brand, logo, message, symbol, function or the like on a surface of the desired vulcanized article. For example, the display assembly 10 can be configured as a continuous member that is disposed along an entire portion of the vulcanized article, e.g., such as a sidewall stripe or other form of continuous indicia, or only along a partial designated portion of the vulcanized article.

In an example, each such display assembly 10 comprises one or more display layers that provide an outer surface of the display assembly that operates to visually provide the display image or indicia or function. The one or more display layers may be formed from an elastomeric material and may be configured to provide a desired display image or indicia on the outer surface of the display assembly 10. In an example, the display layer may be constructed to have a desired color and/or pattern, and or shape, and/or texture useful to provide a desired display image or indicia or function. In an example, the display layer may be configured and/or colored and/or patterned to produce a desired display image or indicia or function in conjunction with an underlying barrier layer. For example, the display layer may comprise one or more openings, e.g., a pattern of openings, and be of one color, and an underlying barrier layer may be of another color making it viewable through the display layer openings to provide the desired display image or indicia effect or function on the outer surface of the display assembly. In the event that two or more display layers are used, the different display layers may be configured and/or colored and/or textured, and/or patterned differently for the purpose of being combined together to provide the overall desired display image or indicia on the outer surface of the display assembly.

In an example, each display layer may be configured having a generally similar shape, e.g., in the shape of a letter, object, or numeral, wherein one of the display layers is provided in one color and another of the display layers is provided in a different color, and wherein the display layers are sized differently, so when combined together they operate to provide a desired visual display effect. In an example, an upper display layer may be provided having a white color and a lower display layer beneath the upper display layer may be provided having a black color, wherein the lower display layer is sized somewhat larger than the upper display layer so as to enhance the visual effect provided by the combined display layers.

Alternatively, the display layer may be provided in the form of a single layer that is patterned or that has a desired cut-out segment, and the desired display image is provided by contrast with an underlying other layer of the display assembly, e.g., which may be another display layer or a barrier layer. For example, the use of a patterned display layer in one color disposed on top of an underlying display layer or barrier layer of another color may operate to provide a desired indicia, e.g., that may be in the form of a barcode or the like used to provide an identification or other type of purpose or function.

The display assembly 10 is adhered to or otherwise attached to a surface of the desired vulcanized article 12. In an example, the display assembly is adhered to the vulcanized article in a manner as better described below that produces a strong and lasting attachment therewith, e.g., to facilitate attachment of the display assembly to the vulcanized article for a long period of time which may be the service life of the vulcanized article. In an example, the display article is chemically bonded with the vulcanized article. In an example, the display assembly may be configured to match the contour or other surface geometry or surface feature of the vulcanized article that it is to be used with. For example, in the event that the vulcanized article is a side wall surface of a rubber tire, display assemblies as disclosed here may be configured to match the contour of the side wall surface to promote a desired optimal fit therewith when attached thereto.

Figure 2:
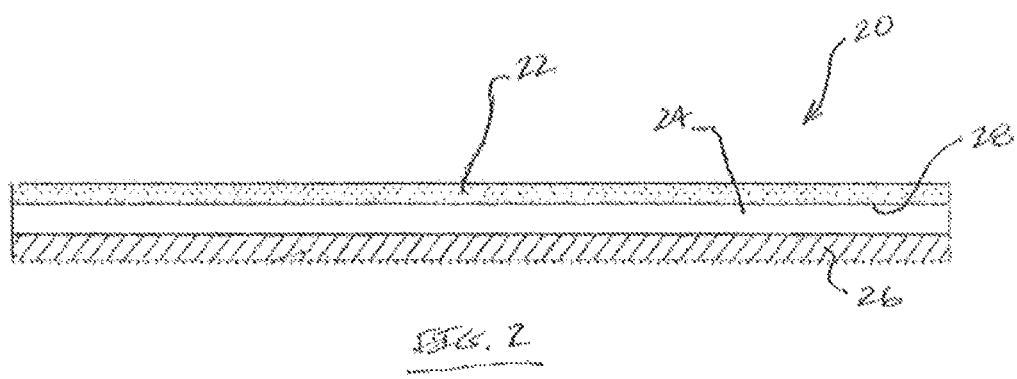
FIG. 2 is a cross-sectional side view of a single display layer embodiment three-layer assembly '20' as disclosed herein, wherein layer '22' is defined as the outermost aesthetic layer which is vulcanized for a permanent bond along underside surface '28' to a shock absorbing barrier layer '24' layered with an adhesive layer '26' for permanently bonding to the vulcanized rubber article.

FIG. 2 illustrates a first example display assembly 20 as disclosed herein comprising, moving from a surface portion of the display assembly 20 to a portion attached to a vulcanized rubber article, a display layer 22, an intermediate or barrier layer 24, and an adhesive layer 26. As noted above, the display assembly 20 is configured having a shape and size as desired for a particular end-use application. In an example, the display layer 22 is provided in the form of a single layer of elastomeric material that may be colored, and/or patterned, and/or textured as desired to provide a desired display image or indicia viewable on the outer surface of the display assembly 20. In an example embodiment, elastomeric materials useful for forming the display layer 22 include and are not limited to vulcanized rubber, natural rubber, SBR, nitrile rubber, neoprene rubber, rubber based or elastomeric ink having properties of aesthetic appeal of functional use, high elongation, UV and chemical resistance and abrasion resistance, and combinations thereof. In an example, depending on the particular size and configuration of the display assembly 20, the display layer 22 may have a thickness greater than about 0.01 mm, of from about 0.01 to 10 mm, 0.05 to 5 mm, 0.1 to 3 mm, and in a particular example about 0.4 mm.

In an example, the intermediate or barrier layer 24 is attached or adhered along an underside surface 28 of the display layer 22. In an example, the intermediate layer 24 extends along and covers the entire underside surface 28 of the display layer. Alternatively, the intermediate layer 24 may extend along a partial portion of the display layer underside surface 28, which is less than the entire portion and more than a majority or 51 percent of the total area of the display layer underside surface 28. In an example, the intermediate or barrier layer 24 is formed from a material capable of providing properties of shock absorbance, elastomeric expansion and/or contraction properties compatible with the vulcanized rubber article that the display assembly is to be attached therewith, and a desired degree of conformity between the adjacent surfaces of the display layer and the outer surface of a vulcanized rubber article (so as to maximize the surface contact area between the display assemble and vulcanized rubber article). Further, in the example illustrated in FIG. 1, it is desired that the intermediate layer 24 be formed from a material capable of being chemically bonded to or vulcanized with the display layer 22.

It is also desired that the intermediate or barrier layer 24 be formed from a material capable of acting as a barrier to minimize or prevent the migration of any unwanted constituents of the adhesive layer 26 and/or the vulcanized rubber article may otherwise operate to damage or degrade the design image and/or feature provided by the display layer 22. In an example, the intermediate layer is formed from an elastomeric material. Elastomeric materials useful for forming the intermediate layer 24 include and are not limited to gum rubber, vulcanized natural rubber SBR, nitrile rubber, polyurethane, or comparable materials having properties of high elongation, conformity and chemical resistance to notable mold release agents common in the vulcanized rubber of pneumatic tires, and combinations thereof. In an example, depending on the particular size and configuration of the display assembly 20, it is desired that the intermediate layer 24 thickness be that which is sufficient to enable the intermediate layer to function in the above-described manner. The exact thickness of the intermediate layer is understood to vary depending on the particular type of material selected for the intermediate layer as well as the particular end-use application. In an example, the intermediate layer 24 may have a thickness greater than about 0.008 mm, from about 0.008 to 10 mm, about 0.01 to 5 mm, about 0.1 mm to 1.5 mm, and in a particular example of about 0.5 mm.

It is desired that the adhesive layer 26 be formed from a material capable of forming a chemically, heat-activated or otherwise permanent bonded attachment with the vulcanized rubber article. In an example, it is desired that the attachment be one having a service life that is the same as the vulcanized rubber article so as to provide a permanent attachment therewith to permit the display assembly to function throughout the service life of the vulcanized article. The particular type of material used for the adhesive layer may vary depending on the particular display assembly application environment, e.g., in a manufacturing environment of where the vulcanized article is being made, or in a consumer environment subsequent to the manufacture of the vulcanized article. In an example, embodiment, such as one where the display assembly is being attached to the vulcanized rubber article at the point of the vulcanized rubber article being manufactured, the adhesive layer may be formed from a material capable of forming the desired chemical bond or being vulcanized thereto under elevated temperature conditions, e.g., heat-activated adhesives. Such materials include but are not limited to thermoplastic and thermoset adhesives, heat vulcanizing cements common in retread applications, water-based or solvent based polymer polyurethane based adhesives, and combinations thereof. Such application may also call for some degree of elevated pressure being applied to the display assembly during adherence by the adhesive layer. In an example, such elevated pressure may be in the range of from about 3 to 100 Psi.

In an example, embodiment, such as one where the display assembly is being attached to the vulcanized rubber article by a consumer or the like at a point subsequent to the manufacture of the vulcanized rubber article, the adhesive layer may be formed from a material capable of forming the desired chemical bond or being vulcanized thereto ambient temperature conditions, e.g., by chemical reaction instead of being heat activated. Such materials include but are not limited to chemical cements common in retread applications, cyanoacrylate, epoxies, rubber-based acrylic pressure sensitive adhesives and combinations thereof. Such application may also call for some degree of elevated pressure being applied to the display assembly during adherence by the adhesive layer. In an example, such elevated pressure may be in the range of from about 3 to 10 Psi.

In an example, depending on the particular size and configuration of the display assembly 20, it is desired that the adhesive layer 26 thickness be that which is sufficient to enable the adhesive layer to function in the above-described manner. The exact thickness of the adhesive layer is understood to vary depending on the particular type of material selected for the adhesive layer as well as the particular end-use application. In an example, the adhesive layer 26 may have a thickness greater than about 0.006 mm, from about 0.006 mm to 0.5 mm, 0.01 mm to 0.3 mm, 0.02 mm to 0.1 mm, and in a particular example of about 0.04 mm.

In an example, the display assembly described above and illustrated in FIG. 2 may be made by joining the display layer and intermediate layer together and then subjecting the same to vulcanizing conditions of elevated temperature and/or pressure, after which time the adhesive layer may be combined therewith, e.g., at the point of applying the display assembly. While the example display assembly illustrated in FIG. 2 has been disclosed as comprising three separate and distinct layers, it is to be understood one or both of the display layer or the adhesive layer may be configured so as to include a barrier composition at an interface therebetween that may operate to provide the barrier properties noted above, thereby avoiding the need use three separate and distinct layers for the display assembly.

Figure 3:
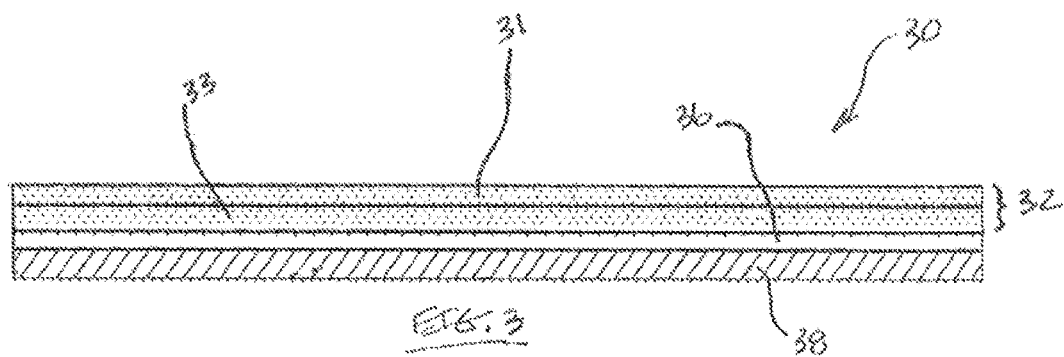
FIG. 3 is a cross-sectional side view of a second example display assembly as disclosed herein, wherein a double display layer embodiment comprises a four-layer assembly '30' having a first display layer '31' as the outermost aesthetic display layer which is vulcanized for a permanent bond to a second display layer '33' which is further vulcanized to a shock absorbing barrier layer '36' layered with an adhesive layer '38' for permanently bonding to the vulcanized rubber article.

FIG. 3 illustrates a second example display assembly 30 as disclosed herein comprising, moving from a surface portion of the display assembly 30 to a portion attached to a vulcanized rubber article, a display layer 32, an intermediate or barrier layer 36, and an adhesive layer 38. Unlike the example illustrated in FIG. 2 and described above, the display layer 32 in this example is made up of two or more different display layers, e.g., a first or upper display layer 31 and a second or lower display layer 33.

In this embodiment, each display layer may be sized, shaped, patterned, colored and/or textured differently from the other to provide a desired display indicia when combined together. For example, the first display layer 31 may be white in color and have a particular size, wherein the second display layer 33 may be black in color and be sized slightly larger than the first display layer for purpose of providing a desired display visual indicia. This is but one example of how the different display layers 31 and 33 can be used with one another to provide a desired display indicia. In another example, as noted above, the first display layer may be of one color and have one or more openings cut into it, and the second display layer is of another color so such color is displayed through the openings to provide a desired visual indicia on the surface of the display assembly. These are but a few examples of how the first and second display layers can be used to provide a desired display indicia for purpose of example and reference, and it is to be understood that all such variations are to be within the scope of the display assemblies as disclosed herein. Also, while an example comprising two display layers has been disclosed, it is to be understood that display assemblies as disclosed herein may comprise more than two display layers depending on the particular display indicia desired for the particular end use application.

The display layers 31 and 33, as well as the intermediate layer 36 and adhesive layer 38 may each be formed from the same types of respective materials described above for the earlier examples. In an example, the display layers 31 and 33 may have the same thickness as described above, so that the overall thickness of the display layer 32 is generally greater than that of the earlier described examples. However, the thickness of the display layer 32 may also be less than or equal to the thickness of earlier described examples so as to meet the requirements of a particular function or aesthetic desire. As noted above for the example display assembly of FIG. 2, the example display assembly illustrated in FIG. 3 may alternatively comprise a display layer or adhesive layer configured having a barrier composition at an interface, so as to avoid the need to obtain desired barrier properties through a separate and distinct barrier layer.

In an example, the display assembly described above and illustrated in FIG. 3 may be made by joining the display layers, and intermediate layer together and then subjecting the same to vulcanizing conditions of elevated temperature and/or pressure, after which time the adhesive layer may be combined therewith, e.g., at the point of applying the display assembly.

Figure 4A:
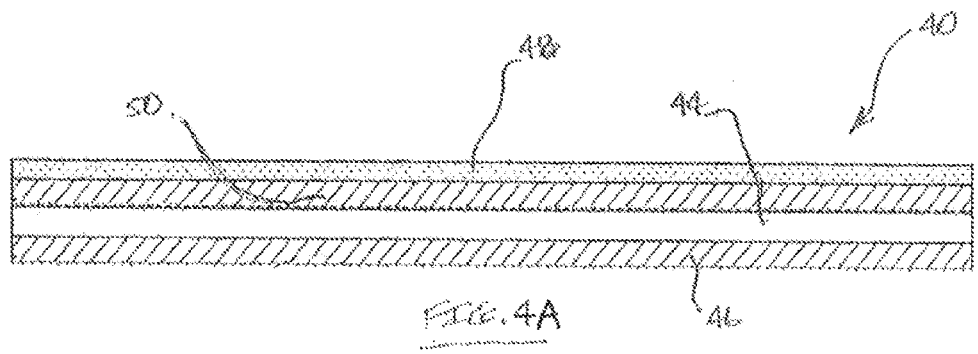
FIG. 4A is a cross-sectional side view of a third example display assembly as disclosed herein comprising a single display layer with double layer adhesive and barrier four-layer assembly '40' having layer '48' as the outermost aesthetic display layer which is bonded with a shock absorbing barrier layer '44' using a permanent adhesive layer '50' and the barrier layer '44' is layered with another adhesive layer '46' for permanently bonding to the vulcanized rubber article.

FIG. 4A illustrates a third example display assembly 40 as disclosed herein comprising, moving from a surface portion of the display assembly 40 to a portion attached to a vulcanized rubber article, a display layer 48, an intermediate adhesive layer 50, an intermediate or barrier layer 44, and an adhesive layer 46. The principle difference between this second example display assembly 40 and that disclosed above and illustrated in FIG. 2 is the presence and use of an intermediate adhesive layer 50 interposed between the display layer 48 and the intermediate or barrier layer 44. The presence of such an intermediate adhesive layer 50 in this second example operates to provide a greater degree of adhesion between the display layer 48 and the intermediate layer 44, and may also operate to provide and extra degree of barrier protection against the migration of any unwanted constituents from the intermediate layer 44, adhesive layer 46, and/or the vulcanized rubber article that the display assembly is attached to.

The materials used in this second example for the display layer 48, intermediate layer 44, and adhesive layer 46 may be selected from the same types of materials described above for the first two examples. The thicknesses of the display layer 48, intermediate layer 44, and adhesive layer 46 may also be the same as that described above for the first two examples.

The intermediate adhesive layer 50 is formed from a material capable of forming a bonded attachment between and underside surface of the display layer 48 and a surface of the intermediate barrier layer 44, and optionally acting as a barrier to minimize or prevent the migration of any unwanted constituents into the display layer 48. In an example, the intermediate adhesive layer 50 is formed from a thermoset adhesive. Thermoset adhesives useful for forming the intermediate adhesive layer 50 include and are not limited to heat vulcanizing cements common in retread applications, water-based or solvent based polymer polyurethane based adhesives, epoxies and combinations thereof. In an example, depending on the particular size and configuration of the display assembly 40, it is desired that the intermediate adhesive layer 50 thickness be that which is sufficient to enable the intermediate adhesive layer to function in the above-described manner. The exact thickness of the intermediate adhesive layer is understood to vary depending on the particular type of material selected for the display layer and the intermediate layer as well as the particular end-use application. In an example, the intermediate adhesive layer 50 may have a thickness greater than about 0.006 mm, of from about 0.006 mm to 0.5 mm, about 0.01 mm to 0.3 mm, and in a particular example about 0.025 mm.

In an example, the display assembly described above and illustrated in FIG. 4 may be made by joining the display layer, the intermediate adhesive layer, and intermediate layer together and then subjecting the same to vulcanizing conditions of elevated temperature and/or pressure, after which time the adhesive layer may be combined therewith, e.g., at the point of applying the display assembly. While the example display assembly illustrated in FIG. 4A has been disclosed as comprising four separate and distinct layers, it is to be understood that one or more of the display layer, intermediate adhesive layer, barrier layer, or the adhesive layer may be configured as a composite having properties of another layer so as to reduce the total number of separate and distinct layers used for making the display assembly 40. For example, the intermediate adhesive layer may be configured having a barrier composition along an interface with the adhesive layer, thereby avoiding the need to use a separate and distinct barrier layer, or the barrier layer may be configured comprising an adhesive composition on or both of its surfaces so as to avoid having to use one or more separate adhesive layers. These are just a few examples of how composite compositions may be used in such multilayer display assemblies to reduce the total number of separate and distinct materials layers used while still providing all of the desired described properties.

Figure 4B:
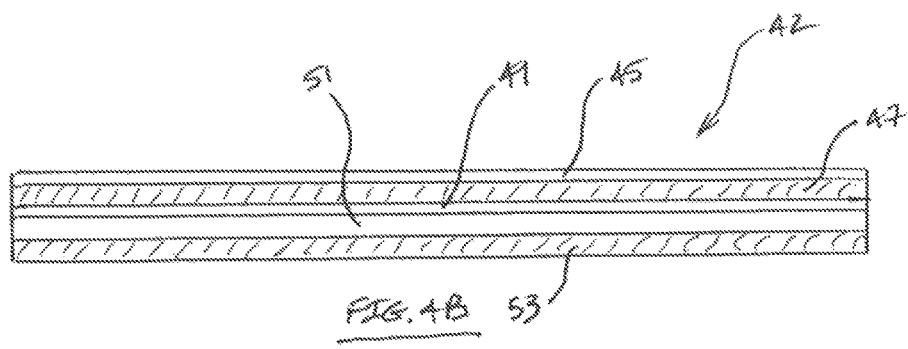
FIG. 4B is a cross-sectional side view of an alternative third example display assembly as disclosed herein comprising dual display layers with double layer adhesive and barrier—five layer assembly '42' having layer '45' as the outermost display layer which is bonded with a second or intermediate display layer '49' using an intermediate adhesive layer '47' and the intermediate display layer is bonded with a shock absorbing barrier layer '51' that is layered with another adhesive layer '53' for permanently bonding to the vulcanized rubber article.

FIG. 4B illustrates an example display assembly 42 that is somewhat similar to that illustrated in FIG. 4A, in that it comprises a display layer 45 on a top surface, an intermediate adhesive layer 47 below the display layer. However, in this particular example, the display assembly 42 includes a second or intermediate display layer 49 that is interposed between the intermediate adhesive layer 47 and the barrier layer 51, and like in the third example an adhesive layer 53 is disposed beneath the barrier layer. A feature of such construction is the ability to configure the uppermost display layer 45, e.g., shape, size and/or patterning of openings or the like to reveal at least a portion of the intermediate display layer 49 to provide the desired display indicia. Also, in such an example, a sub assembly made up of the adhesive layer 53, barrier layer 51, and intermediate display layer 49 may be made and combined in the manner noted above and adhered to the desired substrate portion, e.g., a vulcanized rubber article. After such sub assembly has been attached to the desired substrate, then the uppermost display layer 45 may be attached thereto through the use of the intermediate adhesive layer 47. The ability to construct the display assembly in this manner, through the use of a sub assembly and later applied display layer adds flexibility in being able to provide the desired display layer after a portion of the assembly has already been installed on the substrate. It also allows for the subassembly to be manufactured and kept in stock as the standard subassembly for a variety of different types of upper most display layers. An example of such a display assembly may include white walls, red walls, or other colored walls or other desired type of indicia that may now be selected and applied after the standard stock subassembly has been attached to the substrate.

Figure 5:
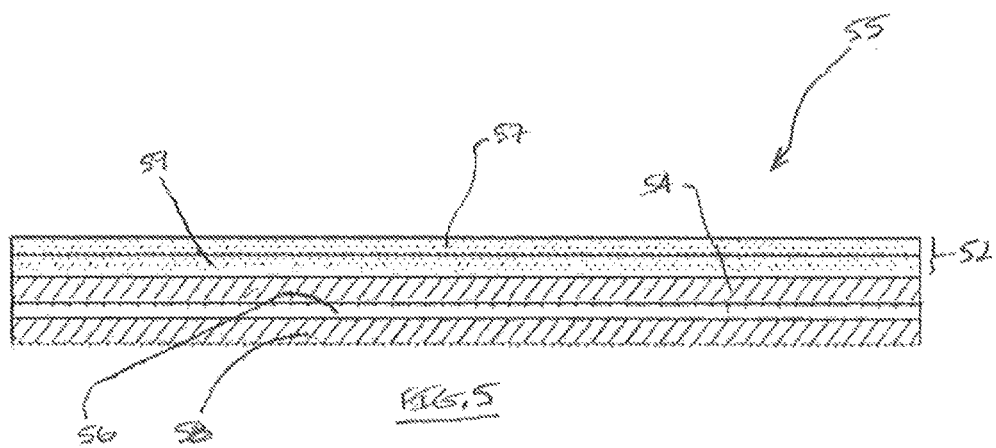
FIG. 5 is a cross sectional side view of a fourth example display assembly as disclosed herein comprising a double display layer '52' embodiment five-layer assembly '55' having layer '57 as the outermost aesthetic display layer which is vulcanized for a permanent bond to a second display layer '59' which is bonded with a shock absorbing layer '56' using a permanent adhesive layer '54' and the barrier layer '56' is layered with another adhesive layer '58' for permanently bonding to the vulcanized rubber article.

FIG. 5 illustrates a fourth example display assembly 55 as disclosed herein comprising, moving from a surface portion of the display assembly 55 to a portion attached to a vulcanized article, a display layer 52, an intermediate adhesive layer 54, an intermediate barrier layer 56, and an adhesive layer 58. Like the example illustrated in FIG. 3 and described above, the display layer 52 in this example is made up of two or more different display layers, e.g., a first or upper display layer 57 and a second or lower display layer 59. Like the example illustrated in FIG. 4A and described above, the display assembly 50 comprises an intermediate adhesive layer 54 that is interposed between the display layer 52 and the intermediate barrier layer 56.

The intermediate adhesive layer 54 operates in the same manner as described above for the example illustrated in FIG. 4A, to provide a greater degree of adhesion between the display layer 52 and the intermediate barrier layer 52, and may be formed from the same materials and have the same layer thickness as that described above for the example illustrated in FIG. 4A.

In an example, the display assembly 50 may be made by joining the display layer, the intermediate adhesive layer, and intermediate layer together and then subjecting the same to vulcanizing conditions of elevated temperature and/or pressure, after which time the adhesive layer may be combined therewith, e.g., at the point of applying the display assembly.

Figure 6:
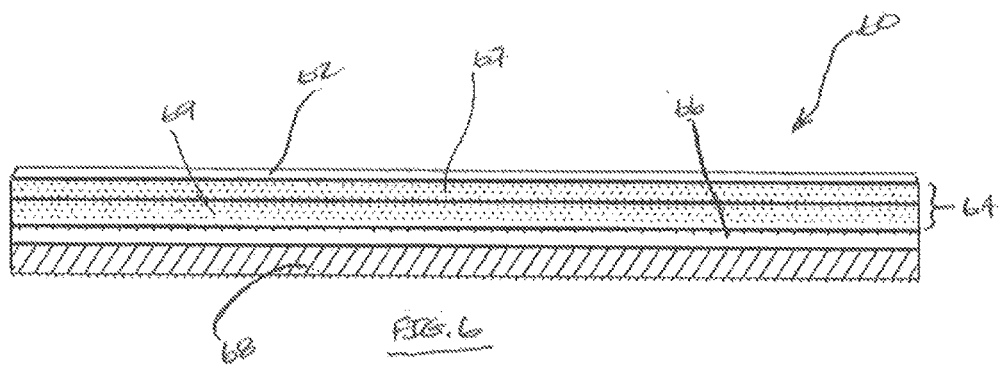
FIG. 6 is a cross section side view of a fifth example display assembly as disclosed herein comprising a double display layer '64' four-layer embodiment assembly '60' having layer '62' as a protective over-laminate layer disposed over all or a portion of the display layer(s) '67' and '69' vulcanized to a shock absorbing barrier layer '66' and layered with a permanent adhesive layer '68' for bonding to the vulcanized rubber article.

FIG. 6 illustrates a fifth example display assembly 60 as disclosed herein comprising, moving from a surface portion of the display assembly 60 to a portion attached to a vulcanized article, protective layer 62, a display layer 64 (comprising an upper display layer 67 and a lower display layer 69), an intermediate barrier layer 66, and an adhesive layer 58. A feature of this example is the presence of a protective layer 62 that is disposed over the display layer, wherein the protective layer is formed from an optically transparent material and may be used to enhance and/or protect the display layer from external elements that may damage or otherwise degrade the indicia provided by the display layer, thereby enhancing the service life of the display assembly. While the protective layer has been disclosed in the context of being used with the particular display assembly construction as illustrated in FIG. 6, it is to be understood that the protective layer may be used with any and all of the display assemblies as disclosed herein.

In an example, the protective layer may cover the entire surface of the underlying display layer, or display layers in the event the display assembly comprises more than one display layer, or a partial portion of the display layer depending on the particular display indicia and/or the particular end-use application. Materials useful for forming the protective layer are preferably elastomeric, e.g., having the same degree of flexibility or elasticity as that of the underlying display layer, and may be selected from materials including and not limited to polyurethane, vinyl, polyethylene terephthalate, rubber-based elastomeric inks, and combinations thereof. In an example, depending on the particular size and configuration of the display assembly, it is desired that the protective layer thickness be that which is sufficient to enable the protective layer to function in the above-described manner. The exact thickness of the protective layer is understood to vary depending on the particular type of material selected for the protective layer as well as the particular end-use application. In an example, the protective layer may have a thickness greater than about 0.006 mm, of from about 0.006 mm to 0.3 mm, about 0.01 mm to 0.2 mm, and in a particular example about 0.025 mm.

FIG. 7 illustrates a sixth example display assembly 70 as disclosed herein comprising, moving from a surface portion of the display assembly 70 to a portion attached to a vulcanized article, a display layer 72, an intermediate adhesive layer 74, an intermediate barrier layer 76, and an adhesive layer 77, wherein a cavity 78 is disposed within the assembly for the purpose of accommodating an element or object 79 therein. Like the example illustrated in FIG. 5 and described above, the display layer 72 in this example is made up of two or more different display layers, e.g., a first or upper display layer 80 and a second or lower display layer 82.

A feature of this particular embodiment is the presence of a cavity 78 that is formed in the display assembly 70 for the purpose of accommodating placement of an element or object 79 therein. For purpose of reference, a display construction somewhat similar to that illustrated in FIG. 5 was used to disclose the cavity feature for purposes of reference and example, and it is to be understood that display assemblies as disclosed herein comprising cavities may be embodied having other display assembly constructions as disclosed herein.

In this example, the cavity is formed within the second display layer 82 and the intermediate adhesive layer 74 and is configured to accommodate a desired element or object therein, wherein such element or object may be any type of rigid or non-rigid element, passive or non-passive element, functional or nonfunctional element that may be useful for including in the display assembly. Examples of the types of objects or elements that may be disposed in the cavity include RFID elements, GPS elements, lighting elements such as LEDs or the like, and the like. In an example, the cavity is configured within the construction to provide an area capable of accommodating such an element or object without damaging the element or object, and without causing damage to the display assembly itself during use of the vulcanized rubber article that it is attached thereto. In the example illustrated in FIG. 7, the cavity is positioned beneath the first display layer 80, and if desired the first display layer may comprise one or more openings for the purpose of displaying a portion of the object or element disposed within the cavity. It is to be understood that display assemblies comprising a cavity as disclosed herein may include the cavity positioned differently, e.g., formed within one or more different assembly layers, than that illustrated in FIG. 7 depending on the particular display assembly, the particular configuration of the cavity, the particular element or object disposed within the cavity and its intended purpose and/or function, and/or the particular end-use application of the vulcanized article.

While the cavity feature of display assemblies has been disclosed with reference to particular examples and illustrations, it is to be understood that display assemblies as disclosed herein may be constructed with the cavity positioned other than as disclosed or illustrated. For example, the design assembly may be configured with the cavity deposed along an outer portion of the assembly, which may be a display layer, in which case an element disposed within the cavity would be viewable from outside of the display assembly. An example of such may be one where a light element is disposed within the cavity for purposes of providing illumination or an illuminated visual effect or the like outside of the display assembly that is viewable from outside of the vulcanized article. In such example, the cavity may be open and exposed to the external environment, or a layer of transparent material or the like may be optionally disposed thereover. This is but one example provided for the purpose of illustrating how the cavity may be positioned differently within the display assembly to enable a desired function or purpose.

While the display assemblies as disclosed herein have been referenced by example and illustration having certain features and/or characteristics, it is to be understood that display assemblies meeting the general construction parameters as disclosed herein and having additional elements are intended to be within the scope of display assemblies as covered herein. For example, while display assemblies may be configured to provide a desired display indicia or the like through the shape, design, configuration or the like of the one or more display layers, Display assemblies as disclosed herein may be configured to provide a desired display indicia through the use of printed, marked or other type of provided feature that may be included in or on the display layer. For example, the display assembly may comprise a desired display indicia provided in the form of an ink symbol, letter, or other marking feature or object that is disposed on or into the display layer, which symbol, letter, or other marking feature or object may be a brand, logo or the like.

Display assemblies as disclosed herein may have a different total thickness depending on the particular construction features within the display assembly. In an example, the display assembly may have a total thickness, as measured from a top surface of the display assembly (adjacent the display layer or protective layer) to a bottom surface (adjacent the adhesive layer) of greater than about 0.0025 mm, from about 0.0025 mm to 10 mm, from about 0.01 to 5 mm, about 0.1 to 3 mm, and in a particular example about 0.4 mm. It is to be understood that the exact thickness of the display assembly can and will vary depending on the particular display assembly construction and/or end-use application.

Display assemblies as disclosed herein may be constructed to accommodate different conditions for applying the display assembly to a desired vulcanized rubber article, e.g., to accommodate application during manufacturing of the vulcanized rubber article, or to accommodate application after the vulcanized rubber article has been made. In an example, display assemblies may be attached to a surface of a vulcanized rubber article, e.g., a sidewall surface of a pneumatic tire, by reaction that may include and not be limited to heat and/or pressure and/or chemical bonding so as to provide a desired aesthetic appeal in the form of desired visual indicia, such as lettering and/or other objects or shapes or designs and/or functional use, such as with bar coding or RFID technology, capable of withstanding the tire manufacturer recommended life cycle. In an example, the element or object disposed within the cavity and affixed to the vulcanized article via the display assembly as disclosed herein may have compatibility programmable functionality, such as RFID read/write capability, circuit board/programmable system which can control a device such as a light element like an LED in a predetermined manner. Such functionality may be innate with the element disposed in the cavity or may be controlled by a separate component whether connected by wire or wirelessly, e.g., blue-tooth enabled, radio controlled or other frequency connection. In an example, the cavity may be configured within the display assembly to accommodate a light element there, such as one or more LEDs therein, so that the display assembly emits light that can be seen by a person looking at the vulcanized article. In an example, the light element may be controlled to provide a desired illumination.

Figure 8A:
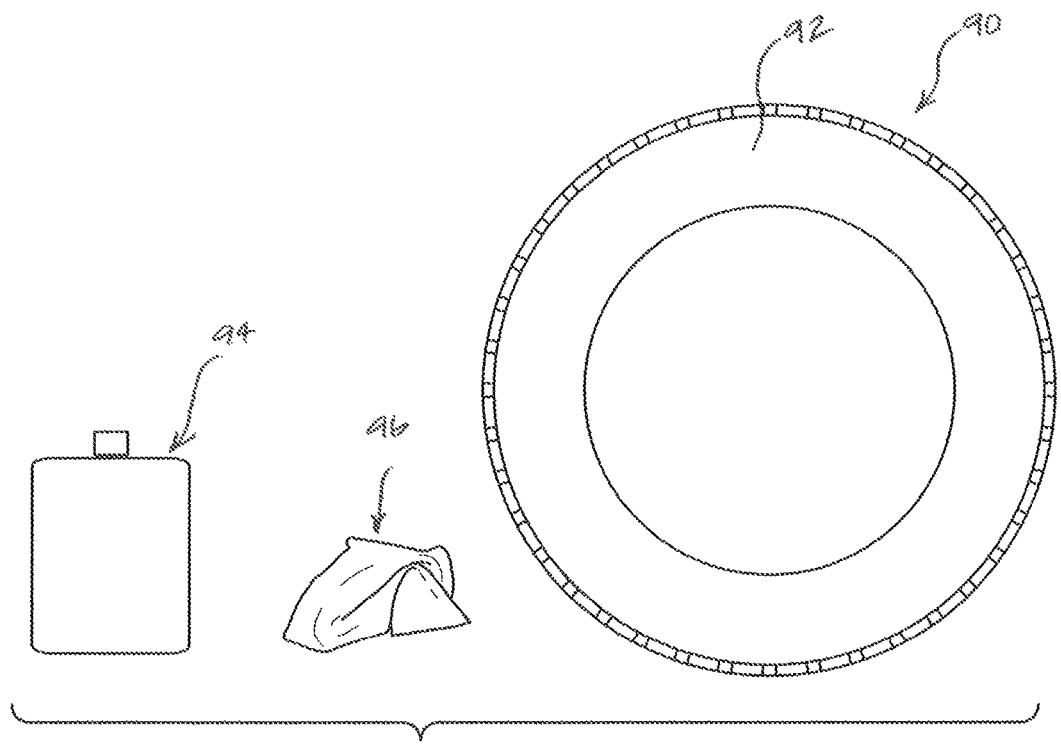
FIGS. 8A to 8H are schematic views of different steps of an example method for attaching a display assembly as disclosed herein to sidewall of a vulcanized rubber article in the form of a tire.
Figure 8B:
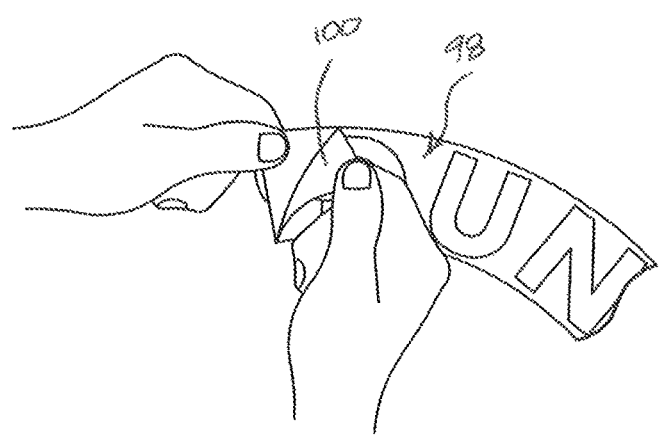
Figure 8C:
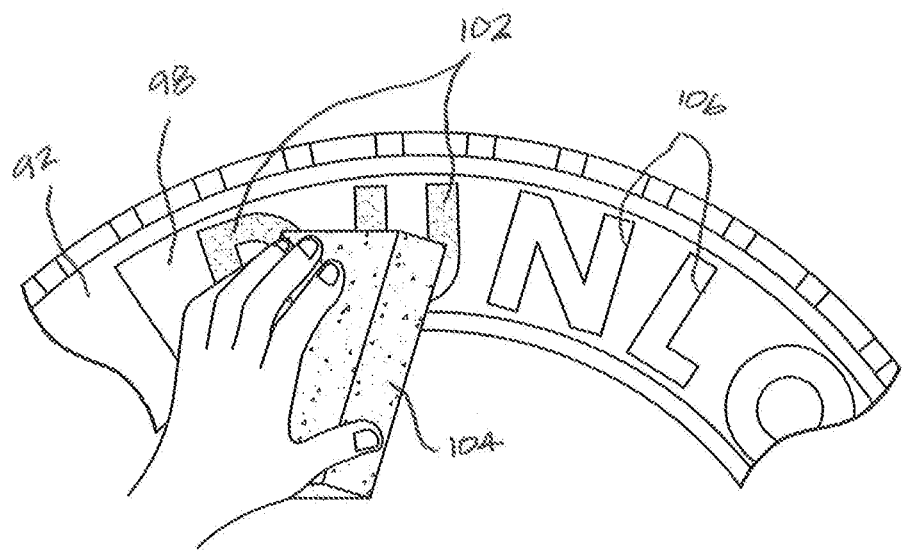

FIGS. 8A to 8H illustrate different steps useful for applying the display assembly according to an example method of applying. Referring to FIG. 8A, in an example method of applying, the intended or target surface 92 of the vulcanized rubber article 90 is cleaned so as to remove any dirt, oil, debris or other foreign agents or containments that could interfere with forming a desired attachment bond with the display assembly. A suitable cleaning solution 94 or preparation agent can be used for this purpose. In an example, such cleaning solution 94 can be selected from but not limited to the group of organic or inorganic solutions such as acetone or the like. In an example, the cleaning solution 94 can be applied and used to clean the surface by use of a fabric material 96 or the like. As illustrated in FIG. 8C, in an example, it may be desired to further treat the surface 92 by roughening the surface through the use of an abrasive means 104 such as sand paper or the like until the surface displays a rough texture, and then cleaning the treated surface, e.g., with the cleaning solution, to ensure that it is free of any surface debris from the treatment process.

Figure 8D:
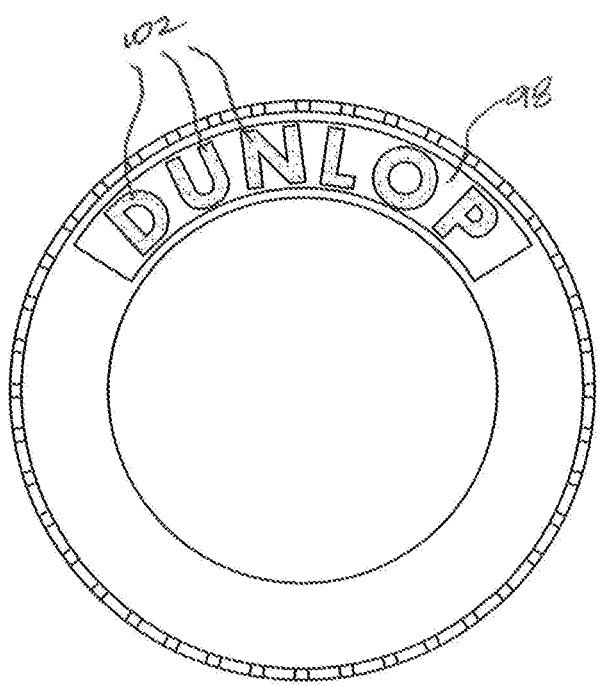

Referring to FIG. 8B, in certain applications, it may be desired to use a stencil 98 or template for the purpose of properly/accurately locating the display assembly on the surface of the vulcanized rubber article. For example, in the case where a series of the display assemblies are to be applied to a sidewall surface of a tire to provide a desired string of letters, numerals and/or designs or the like, a stencil 98 or template may be used to ensure that the display assemblies are positioned at a proper spacing and/or at a proper location along the sidewall surface. The stencil 98 may be provided in the form of a semi-rigid material such as paper, plastic film or the like that can be applied to the target surface. As shown in FIG. 8C, the stencil 98 can be removably attached to the target surface 92 or held in place by hand. Referring back to FIG. 8B, in an example, the stencil 98 or template comprises a pressure sensitive adhesive backing and is prepared for adhered placement against the target surface by removing a carrier sheet 100 covering the adhesive and pressing the stencil into contact with the target surface 92 at the desired position to ensure an adequate bond, specifically around the cut out areas in the stencil (as best shown in FIG. 8C). Referring to FIG. 8C, in an example where a stencil 98 or template is used, the steps of treating the target surface 92 by sanding or the like and then cleaning the treated surface is preferably done after the stencil has been placed into position, thereby limiting the target surface area 102 being prepared to only that exposed by the cut out areas 106 of the stencil 98. FIG. 8D illustrates the target surface areas 102 of the sidewall as treated by sanding with the template 98 still in place.

Alternatively, instead of using a separate stencil for purposes of applying the display assembly in a desired arrangement, the displace assembly may be configured having a transfer carrier adhered to an upper most surface of the display assembly, wherein the display assembly is positioned on the transfer film in a desired arrangement for placement onto the target surface without the use of a stencil to provide the a visual display having the desired arrangement.

Figure 8E:
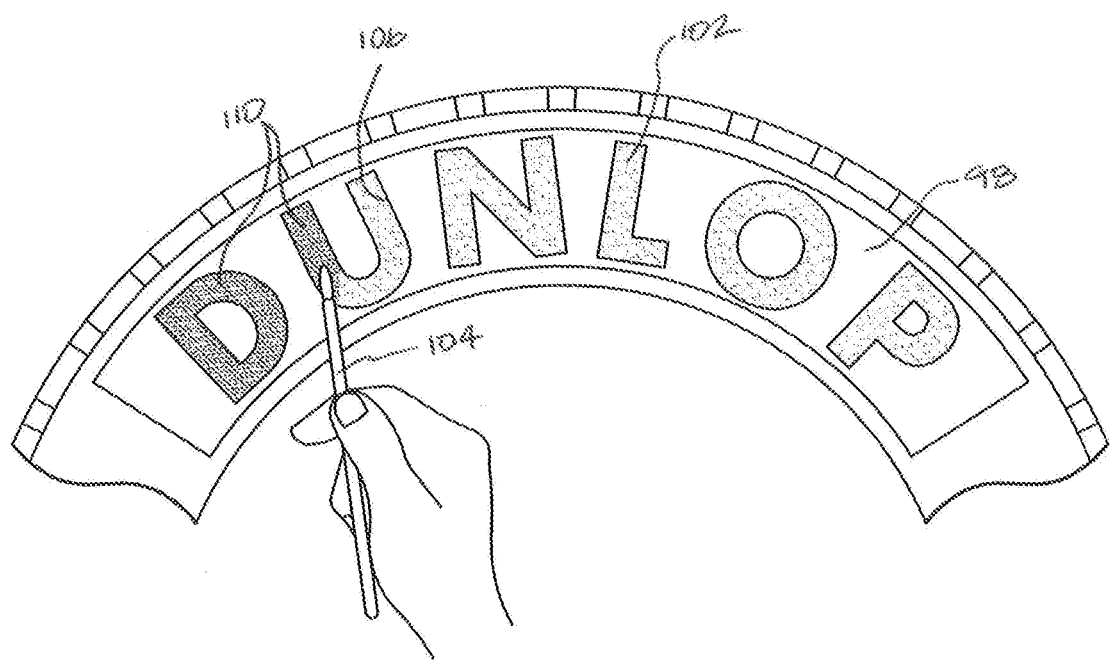
Figure 8F:
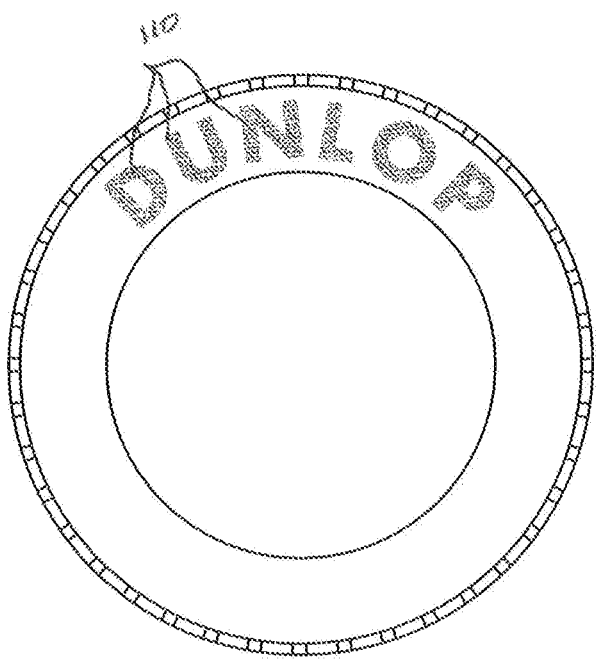

Referring to FIGS. 8E and 8F, a desired adhesive material 110, selected from the materials described above, is applied to the treated surface 102 by suitable means, which can be by spray, roll, brush 104 or the like to form a desired thickness of the adhesive layer to receive the display assembly. In example where a stencil 98 is used, the adhesive 104 is applied to the cut out section or sections 106 and the template 98 is removed before the adhesive cures so as to avoid difficult template removal. FIG. 8F illustrates the treated surfaces coated with adhesive material 110 after with the template removed, wherein the treated surfaces having the adhesive material is in the form of a series of letters. Alternatively, or in addition to the method of adhesive application disclosed above, the adhesive may be applied to the underside surface of the display assembly that is then applied to the target surface.

Figure 8G:
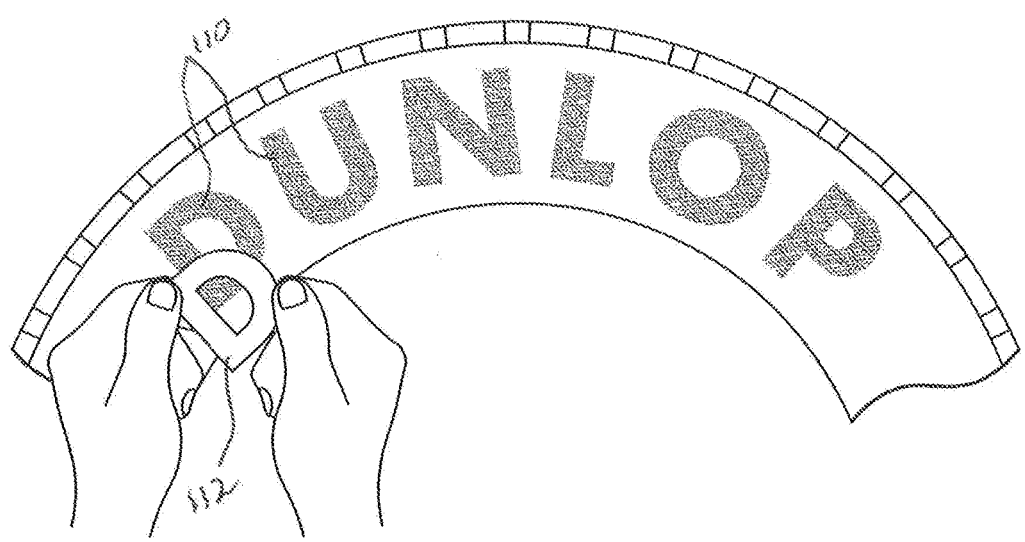
Figure 8H:
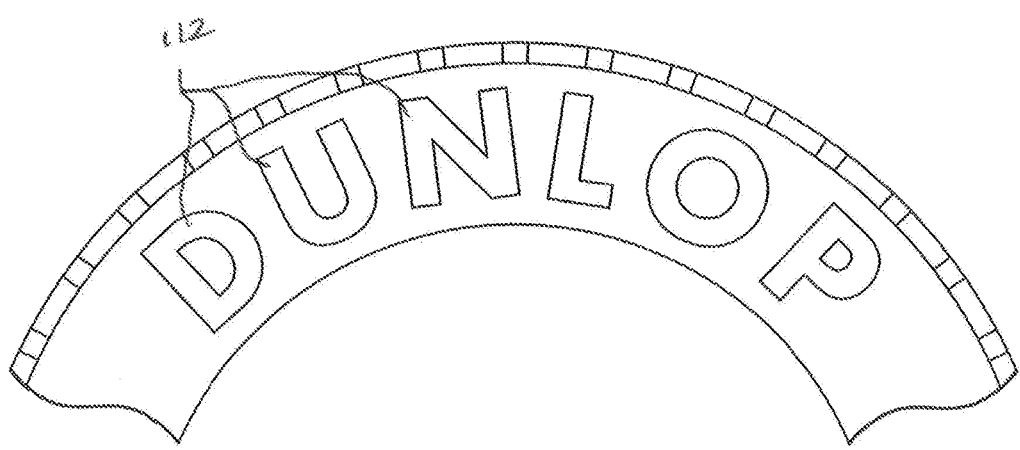

In an example, the adhesive material once applied to the target surface is allowed to dry for a predetermined period of time, which amount of time can and will vary depending in the particular type of adhesive material used. In an example, the adhesive material that is used is Heavy Duty Blue Vulcanizing Fluid by Tech International and it is allowed to dry for a period of approximately 20-30 minutes. Referring to FIGS. 8G and 8H, once the adhesive material 110 has dried for the determined time, the display assembly 112 is placed onto the adhesive material layer 110. In an example, the display assembly 112 is pressed into contact with the adhesive layer and target surface by using a stitching tool, whereby moderate pressure is applied onto the display assembly by rolling the stitching tool over the entire surface area of the display assembly to ensure complete bonding and adherence between the display assembly and the vulcanized rubber article by the adhesive layer. FIG. H illustrates a number of the display assemblies 112 attached to respective target surfaces containing the adhesive material. In the example where a transfer carrier is used rather than the stencil, once the display assembly is applied to the target surface and bonded thereto, the transfer carrier is removed from the display assembly, having served its purpose to provide the display assembly in a desired form, configuration or arrangement on the target surface.

In an example, it is desired that the so-applied display assembly be allowed to cure for a predetermined amount of time before the vulcanized rubber article is placed into use. For example, when the article is a tire sidewall, it is desired that the display assembly be allowed to cure for at least 8 hours before a vehicle comprising the tire or tires are operated. In an example, ideally it is desired that the display assembly be allowed to cure for 24 hours before the vulcanized article in the form of tires are operated.

In another example method, display assemblies as disclosed herein may be applied to a desired vulcanized rubber article at the point of manufacture. In an example, wherein the vulcanized rubber article is a tire, display assemblies may be applied in a similar manner as disclosed above, with a difference being that the adhesive material may be provided in the form of a heat-activated material, in which case once the adhesive material is applied to the target surface heat is used to cause the display assembly to be adhered thereto. In such example, pressure may also be applied by suitable machinery as the adhesive material is curing to ensure a desired bonding occurs between the vulcanized rubber article and the display assembly.

While the display assemblies and method of applying the same as disclosed herein have been presented with respect to the described and illustrated embodiments, it is to be understood that the disclosure is not to be limited to those alternatives and described embodiments.

What is claimed is:

1. A display assembly for attachment with a vulcanized rubber article comprising:
    one or more display layers of elastomeric material configured to provide a display indicia;
    an intermediate layer formed from an elastomeric material that is different from that of the one or more display layers, wherein the intermediate layer is in direct contact with at least of the one or more display layers, and wherein the one or more display layers and the intermediate layer are vulcanized together before attachment with the vulcanized rubber article; and
    an adhesive layer in direct contact with an underside surface of the intermediate layer opposite the one or more display layers, wherein wherein the adhesive layer is formed from a material capable forming a chemical bond with a surface of the vulcanized rubber article at ambient temperature conditions.

2. The display assembly as recited in claim 1 comprising a first display layer and a second display layer disposed beneath the first display layer, wherein the second display layer is in directly contact with a topside surface of the intermediate layer opposite the underside surface.

3. The display assembly as recited in claim 2 wherein the first display layer is colored or shaped differently from the second display layer.

4. The display assembly as recited in claim 1 wherein the adhesive layer is formed from a material capable of providing the chemical bond attachment with the surface of the vulcanized rubber article by hand pressure.

5. The display assembly as recited in claim 4 wherein the hand pressure in from about 3 to 10 Psi.

6. The display assembly as recited in claim 1 further comprising a protective layer disposed over the one or more display layers and forming an outermost surface of the display assembly, the protective layer formed from an optically transparent material.

7. The display assembly as recited in claim 1 further comprising a cavity disposed therein.

8. The display assembly as recited in claim 7 further comprising an element disposed within the cavity.

9. The display assembly as recited in claim 7 wherein the cavity is disposed beneath the one or more display layers.

10. The display assembly as recited in claim 2 wherein the first display layer includes one or more openings therethrough, and wherein the second display layer is visible through the one or more openings.

11. A method for attaching a display assembly to a surface of a vulcanized rubber article comprising the steps of;
    preparing a surface of a vulcanized rubber article by cleaning the surface;
    applying an adhesive material to form an adhesive layer;
    placing a display assembly into contact with the surface with the adhesive layer interposed therebetween to form a bond between the display assembly and surface, the display assembly comprising:
        one or more display layers of elastomeric material constructed to provide a display indicia; and
        an intermediate layer formed from an elastomeric material that is different from that of the one or more display layers, wherein the intermediate layer is vulcanized to at least one of the one or more display layers before attachment to the vulcanized rubber article to form the display assembly;
    wherein during the step of placing, an underside surface of the intermediate layer of the display assembly is placed into direct contact with the adhesive layer, and wherein the adhesive layer is formed from a material that chemically bonds the display assembly to the surface of the vulcanized rubber article at ambient temperature conditions and by hand pressure.

12. The method as recited in claim 11 further comprising treating the surface of the vulcanized rubber article to roughen the surface before the step of placing.

13. The method as recited in claim 12 further comprising applying a template to the surface of the vulcanized rubber article before the step of applying the adhesive material, wherein the template has a cut out section and wherein, during the step of applying, the adhesive material is applied to the surface exposed through the cut out section.

14. The method as recited in claim 11 wherein the hand pressure is from about 3 to 10 Psi.

15. The method as recited in claim 11 wherein the display assembly further comprises an optically transparent protective layer disposed over an outermost surface of the one or more display layers.

16. The method as recited in claim 11 wherein the display assembly comprises a transfer carrier disposed on an outer surface of the one or more display layers and, wherein after the step of placing, the transfer carrier is removed from the display assembly.

17. The method as recited in claim 11 wherein after the step of placing, a further display layer is placed onto the one or more display assembly display layers and an adhesive layer is interposed between the further display layer and the display assembly.

18. The method as recited in claim 11 wherein the vulcanized rubber article is tire, and wherein the surface is a sidewall surface of the tire.

19. A vulcanized rubber tire comprising:
    a target surface disposed along a portion of the rubber tire;
    a display assembly disposed onto the target surface and comprising:
        one or more display layers of elastomeric material;
        an intermediate layer formed from an elastomeric material different from that of the one or more display layers and vulcanized to at least one of the one or more display layers prior to attachment to the target surface; and
        an adhesive layer forming a chemical bond between an underside surface of the intermediate later and the target surface, wherein the chemical bond is formed at ambient temperature conditions.

20. The rubber tire as recited in claim 19 wherein the one or more display layers comprise two display layers, and wherein the two display layers are configured within the assembly to provide a desired display indicia.

* * * * *